Dec. 13, 1960  N. J. HARRICK  2,964,635
INFRA-RED-RADIATION POLARIZER
Filed Sept. 8, 1958

INVENTOR.
N. J. HARRICK
BY
AGENT

United States Patent Office 2,964,635
Patented Dec. 13, 1960

2,964,635

INFRA-RED-RADIATION POLARIZER

Nicolas J. Harrick, Ossining, N.Y., assignor to North American Philips Company, Inc., New York, N.Y., a corporation of Delaware Filed Sept. 8, 1958, Ser. No. 759,602

16 Claims. (Cl. 250—86)

My invention relates to a device for polarizing infra-red-radiation, or for determining the polarization of incident infra-red-radiation. Such devices are useful in analysis systems employing infra-red-radiation, in communication systems involving the detection of infra-red-radiation, and in infra-red optical experiments.

According to my invention, the polarizer comprises a dielectric body that is transparent to infra-red-radiation and has a surface adapted to receive incident infra-red-radiation which traverses the body. A high-resistance metal layer contacts another surface of the body located at a position such that the incident infra-red-radiation impinges on the metal-dielectric interface at an angle of incidence greater than the critical angle for the dielectric material. With this construction, I have found that the metal layer selectively absorbs the component of the infra-red-radation whose electric vector is parallel to the plane of incidence of the incident radiation and perpendicular to the direction of propagation, whereas the component whose electric vector is perpendicular to both the plane of incidence and the direction of propagation is absorbed to a much smaller extent. Thus, the infra-red-radiation reflected from the dielectric-metal interface will comprise a higher proportion of the perpendicular component than of the parallel component, and thus by definition be polarized. Further, by selecting a particular angle of incidence, depending upon the dielectric material utilized, the resistivity of the contacting metal, and the wavelength of the radiation, I have found it possible to obtain 100% polarization of the infra-red-radiation from a single reflection from the dielectric-metal interface.

My invention will now be described in greater detail with reference to the accompanying drawing, in which.

Figure 1A:
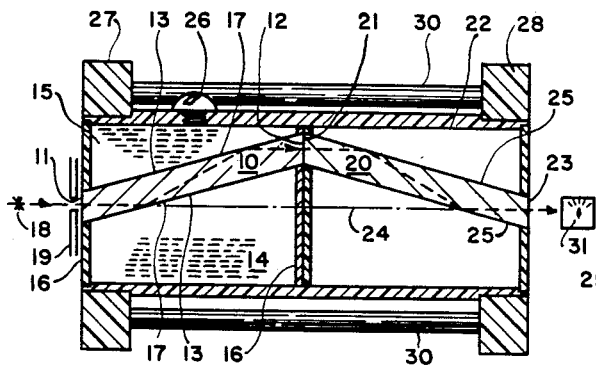
Figs. 1a and 1b are cross-sectional and end views, respectively, of an infra-red-radiation polarizer-analyzer in accordance with my invention.
Figure 1B:
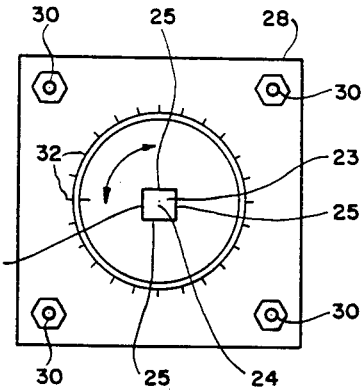

Referring now to Figs. 1a and 1b of the drawing, one form of my invention comprises an infra-red-transparent, rod-like, dielectric body 10 having polished end surfaces constituting entrance 11 and exit 12 surfaces, and planar, polished, side surfaces 13 extending between the end surfaces. The dielectric rod 10 is enclosed in a cylindrical housing 15 in such manner that the rod 10 is seated in apertures of and extends between opposed faces 16 of the cylindrical container 15. The junctions of the rod and end faces of the container are liquid-tight. The entrance surface 11 of the dielectric body 10 is thus exposed. Within the container 15 is provided sufficient liquid mercury 14 to completely envelope the side surfaces 13 of the dielectric body 10, forming plural dielectric-metal interfaces 17. A source of infra-red-radiation 18 is shown schematically in the figure, and a slit system 19 is provided at the entrance surface 11 to constrict the beam from the source 18 to a relatively small angle. The entrance surface 11 is inclined relative to the lower dielectric-metal interface 17 such that normal incidence of the infra-red-radiation on the entrance surface 11 will yield the desired angle of incidence on the dielectric-metal interface 17, which in this case is selected to be about 75°. The optical path followed by the infra-red-radiation in the dielectric body 10 is shown in dotted lines, and, as will be noted, the infra-red-radiation is reflected first from the lower dielectrical-metal interface 17, and then a second time from the upper dielectric-metal interface 17, exiting in a polarized condition from the dielectric body 10 in a direction parallel to but translated from its incident direction.

Contacting the dielectric body 10 is a similar dielectric body 20 arranged so that its longitudinal axis is inclined to the longitudinal axis of the first body 10, and so that its entrance surface 21 intimately contacts the exit surface 12 of the first body 10. The second body 20 is supported within a cylindrical housing 22 integrally united with the container 15 for the first body 10. The center of the opposed end or exit surface 23 of the second body 20 is located on the central axis 24 of the cylindrical housings 15 and 22 and passing through the center of the entrance surface 11 of the first body 10. The optical coupling of the two bodies 10 and 20 is such that the radiation exiting from the first body 10 traversses the second body 20 and reflects twice from dielectric-air interfaces—there being no metal contacting the planar, polished, longitudinal surfaces 25 of the second body 20—at angles of incidence exceeding the critical angle of the dielectric material of the body 20. In such case, total internal reflection of the radiation occurs within the body 20, and the radiation exiting from the end face 23 of the body 20 is substantially identical to that which entered its opposed end face 21, except that it is now reoriented in line with the infra-red-radiation from the source 18. In other words, the first body 10 with its contacting metal functions to polarize the incident infra-red-radiation, whereas the second body 20 without the contacting metal acts to return the beam to its original axis. To provide the first container 15 with the liquid mercury, an opening closed by a screw 26 is provided in a wall thereof. The second container 22, being empty, requires no such expedient.

The device just described will provide a completely polarized infra-red-radiation beam axially aligned with the non-polarized incident beam. Thus, two such devices placed end-to-end, but rotated 90° with respect to each other, will completely cut off an infra-red beam of the proper wavelength. The same device can also be used to measure the nature of polarization of an existing polarized beam. To achieve this result, the united housings 15 and 22 are made rotatable about the axis of symmetry 24 which passes through the center of the opposed end faces of both bodies by being journaled in end supporting plates 27 and 28, which are joined together by four support rods 30. Also, an infra-red-radiation-detector for measuring the intensity of the exiting infra-red-radiation is placed behind the exit surface 23 of the device. This is shown schematically at 31. In operation, assume a polarized infra-red-radiation beam from the source 18 incident on the entrance face 11 of the device shown in Fig. 1. By rotating the housings 15 and 22 and thus varying the orientation of the dielectric-metal interfaces 17 relative to the incident beam, and then measuring the exiting beam intensity for each angular position of the housing—for which purpose indicia 32 may be provided on one of the supporting plates 28—a plot of the exiting beam intensity versus housing angle will show maximum and minimum values at different angles. These maximum and minimum values can be used, by substitution in known optical formulas, to calculate the nature of polarization of the incident infra-red beam.

Figure 2:
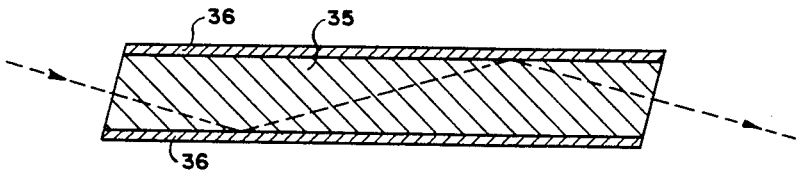
Fig. 2 is a cross-sectional view of a modification.

Fig. 2 shows a modification of the embodiment of Fig. 1 which can function as a simple polarizer. In this case, a single dielectric bar 35 is employed, with solid metal coatings 36 of high-resistivity on top and bottom planar, polished surfaces of the body. Again, plural reflections of the incident infra-red beam obtains, but, in this case, the exiting beam is displaced from though parallel to the incident beam.

As noted above, the dielectric body, itself constituting the optical path for the infra-red-radiation, must be substantially transparent to infra-red-radiation, lest excessive attenuation occurs, and also possess as high a dielectric constant as possible, which also means as high a refractive index as possible as the dielectric constant and refractive index are proportionately related. The most suitable class of materials exhibiting these two properties are the semiconductive materials, though any other materials exhibiting these combined properties will be satisfactory. Examples of the semiconductive materials are germanium ($\epsilon=16$), silicon ($\epsilon=12$), gray tin, and the intermetallic or compound semiconductors such as aluminum antimonide, gallium arsenide, etc. Examples of other materials are rutile titanium dioxide and strontium titanate, though these will be mainly useful in the longer wavelength infra-red region. The dielectric body itself is preferably in the form of a single crystal. While polycrystalline materials would also work, because of the infra-red scattering and dispersion at the grain boundaries, a less efficient polarizer will result. For optimum reflection, the reflecting surfaces should be planar, and polished to reduce scattering. If desired, the entrance surface of the body can be coated with an antireflecting coating as well known in the optical art. While two separate bodies 10 and 20 have been shown in the Fig. 1 embodiment, to reduce losses, it is obviously desirable to unite the two bodies into a single integral unit. The semiconductor dielectric bodies may be made in accordance with the techniques developed in the known semiconductor art, for example, the germanium bodies may be cut from ingots made by a crystal-pulling technique, or by zone levelling. The resistivity of the bodies is preferably maintained high, near intrinsic, if possible, to reduce attenuation of the infra-red. The polished surfaces can be made by conventional grinding, lapping and diamond polishing treatments.

The only requirement for the contacting metal is that it form a layer of high-resistance. Thus, high-resistivity metals are preferred, such as the mercury ($\rho=10^{-4}$ ohm-cm.) of the embodiment of Fig. 1. Similarly, for the Fig. 2 embodiment, a layer of bismuth ($\rho=10^{-4}$ ohm-cm.), which may be provided by vaporization, is highly satisfactory. Both of these metals are characterized by high bulk resistance. In addition however, metals exhibiting low bulk resistance, but exhibiting high resistance when provided in the form of a thin layer, where surface resistance rather than bulk properties would predominate, will be satisfactory. For example, a thin layer of silver will possess a high resistance and thus be suitable. An advantage of the liquid metal is that it can be removed from its container and the intensity of the incident beam measured before as well as after polarization, which may provide useful information in certain circumstances.

Figure 3:
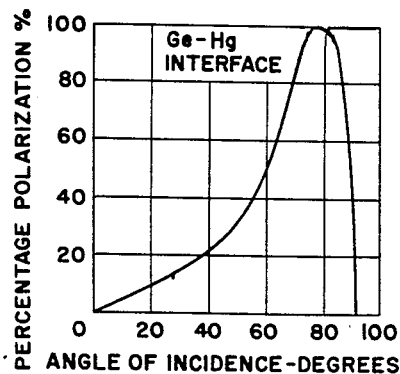
Fig. 3 is a graph showing the relationship between the angle of incidence of the infra-red-radiation on the dielectric-metal interface and the degree of polarization.

The percentage or degree of polarization depends upon the angle of incidence of the infra-red beam on the dielectric-metal interface. This is illustrated in the graph of Fig. 3, which is a plot of the percentage polarization versus the angle of incidence for a single reflection from a germanium-mercury interface of radiation with a wavelength of three microns. The critical angle for germanium, i.e., the angle of incidence, measured from the normal, at which total reflection occurs from a germanium-air interface, is 14.5°. As will be seen from the graph, at angles greater than the critical angle but less than 90° (at 90°, the beam is parallel to the interface), substantial polarization of the beam is obtained, with a maximum of 100% occurring at an angle of about 75°. It will also be noted that the curve is a relatively broad curve, so that at angles from about 67° to 82°, 90% or more polarization will obtain from a single reflection. This is an important feature of the invention, because the incident beam may originate from a point source and thus be diverging from that point upon incidence on the dielectric-metal interface. Though the central ray of the beam may be incident at the optimum angle of 75°, the outer rays will be impinging at angles below and above the optimum angle, and the broadened polarization curve of the inventive device connotes that almost complete polarization of the entire beam will be obtained. Another advantage of the inventive device is that reduced divergence of the beam (better collimation without loss of intensity) occurs because it is entering a medium—the dielectric rod—of high dielectric constant. The air-dielectric interface refracts the beam and thus confines it to smaller solid angles so that a larger percentage of the beam impinges on the dielectric-metal interface at the optimum angle of incidence, promoting a high degree of polarization.

A further broadening of the polarization curve can be obtained by providing for multiple reflections of the infra-red-radiation, which has been shown in the two embodiments of Figs. 1 and 2, though a slight sacrifice in intensity is experienced due to the longer optical path and the loss at the reflecting interface. For example, the half-width of the polarization curve for a single reflection from a germanium-mercury interface can be increased from 30° to 45° by providing a second reflection from a similar interface. In both cases, the principal angle of incidence of 75° is employed. The broader polarization curve means that a wider or more divergent beam can be accepted without a sacrifice in the degree of polarization, and also makes the direction of the incident beam much less critical for best results.

It will be appreciated that the optimum angle of incidence depends upon the choice of dielectric, metal coating and wavelength of radiation to be acted upon. The angle $\phi$ at which maximum polarization occurs is generally termed the "principal angle" and is given by the following:

$$\sin \phi \tan \phi = 7.7\left(\frac{\lambda}{\epsilon \rho}\right)^{1/2}$$

where $\epsilon$ is the dielectric constant of the dielectric, $\rho$ is the resistivity of the metal in ohm-cm., and $\lambda$ is the wavelength in cms. of the infra-red.

The usable wavelength range of the polarizer is determined at the lower end by the lower limit of infra-red transmission of the dielectric. For example, for germanium, the lowest wavelength that can be polarized is 2 microns, and for silicon the value is one micron. The determinant for the upper end of the wavelength range may be taken as the value of the principal angle of incidence. As a practical matter, it is difficult to construct a polarizer in which the angle of incidence exceeds 88°. For this value, the upper limit for germanium is 200 microns, and that for silicon is 150 microns. A further advantage of the inventive arrangement is that the broadened polarization curve makes the device usable over a greater range of incident wavelengths.

While I have described my invention in connection with specific embodiments and applications, other modifications thereof will be readily apparent to those skilled in this art without departing from the spirit and scope of the invention as defined in the appended claims.

What is claimed:

1. An infra-red-radiation polarizer comprising a body constituted of an infra-red-radiation-transparent material possessing a high dielectric constant, and a high-resistance layer of metal in contact with a surface portion of said body, another surface portion of said body being adapted to receive infra-red-radiation which traverses the body to reflect from the dielectric-metal interface at an angle of incidence greater than the critical angle for the dielectric material.

2. A polarizer as set forth in claim 1, wherein said other surface portion is arranged relative to the dielectric-metal interface so that incident infra-red-radiation impinges on the interface at an angle of incidence in the range between 67° and 82°.

3. An infra-red-radiation polarizer comprising a body constituted of an infra-red-radiation-transparent material possessing a high dielectric constant, and a high-resistance layer of metal in contact with a polished, planar, surface portion of said body, another surface portion of said body being polished and adapted to receive incident infra-red-radiation, said other surface portion being arranged relative to the metal-covered planar surface so that the incident infra-red-radiation traverses the body to impinge on the dielectric-metal interface at an angle of incidence greater than the critical angle for the dielectric material.

4. A polarizer as set forth in claim 3, wherein the dielectric body is a single crystal.

5. A polarizer as set forth in claim 3, wherein the dielectric material is a semiconductive material.

6. An infra-red-radiation polarizer comprising a body constituted of an infra-red-radiation-transparent material possessing a high dielectric constant, and layers of high-resistivity metal in contact with plural, polished, planar, surface portions of said body, another surface portion of said body being adapted to receive infra-red-radiation which traverses the body to reflect from a dielectric-metal interface at an angle of incidence greater than the critical angle for the dielectric material.

7. A polarizer as set forth in claim 6, wherein said body has a shape whereby the incident infra-red-radiation undergoes multiple reflections from plural dielectric-metal interfaces before leaving the body.

8. An infra-red-radiation polarizer for polarizing radiation at wavelengths in the range of 2 to 200 microns comprising a single crystal body constituted of germanium, and a layer of mercury in contact with a planar surface portion of said body, another surface portion of said body being adapted to receive infra-red-radiation which traverses the body to reflect from the germanium-mercury interface.

9. A polarizer as set forth in claim 8, wherein the germanium body is shaped so that the incident infra-red radiation impinges on the germanium-mercury interface at an angle of incidence of about 75°.

10. A polarizer as set forth in claim 8, wherein the germanium body is rotatable.

11. An infra-red-radiation polarizer comprising a silicon body, and a layer of high-resistivity metal in contact with a surface portion of said body, another surface portion of said body being adapted to receive infra-red-radiation which traverses the body to reflect from the silicon-metal interface.

12. An infra-red-radiation polarizer comprising a semiconductive single-crystal body constituted on an infra-red-radiation-transparent material possessing a high dielectric constant, and a layer of high-resistivity metal in contact with a planar surface portion of said body, another surface portion of said body being adapted to receive infra-red-radiation which traverses the body to reflect from the semiconductive-metal interface.

13. A polarizer as set forth in claim 12, wherein the metal is selected from the group consisting of mercury and bismuth.

14. A polarizer as set forth in claim 13 wherein the metal is liquid mercury, and means are provided for removing the mercury from contact with the semiconductive body.

15. An infra-red-radiation polarizer comprising a first inclined rod-like body constituted of an infra-red-transparent material possessing a high dielectric constant, a high-resistance layer of metal in contact with a polished, planar surface of the first body, one end surface of said body being adapted to receive incident infra-red-radiation and arranged relative to the metal-covered surface so that incident infra-red-radiation traverses the body to impinge on the dielectric-metal interface at an angle of incidence greater than the critical angle for the dielectric material, and a second oppositvely-inclined rod-like body of an infra-red-transparent material possessing a high dielectric constant located in end-to-end relationship with the first body with one of its end surfaces adjacent the other end surface of the first body, the other end surface of the second body being in line with the said one end surface of the first body and the incident radiation.

16. A polarizer as set forth in claim 15 wherein the first and second rod-like bodies are rotatable about an axis passing through the center of said one end surface of the first body and said other end surface of the second body.

References Cited in the file of this patent

UNITED STATES PATENTS

| | | |
|---|---|---|
| 1,751,584 | Hansell | Mar. 25, 1930 |
| 1,981,999 | French | Nov. 27, 1934 |

OTHER REFERENCES

R. A. Smith et al.: "The Detection and Measurement of Infra-Red Radiation," 1st Edition, 1957, pages 394–395.

UNITED STATES PATENT OFFICE
Certificate of Correction

Patent No. 2,964,635                                                          December 13, 1960

Nicolas J. Harrick

It is hereby certified that error appears in the above numbered patent requiring correction and that the said Letters Patent should read as corrected below.

Column 2, line 25, for "traversses" read —traverses—; column 4, lines 45 and 46, the formula should appear as shown below instead of as in the patent:

$$\sin \phi \tan \phi = 7.7 \left( \frac{\lambda}{\epsilon \rho} \right)^{1/2}$$

Signed and sealed this 11th day of July 1961.

[SEAL]

Attest:

ERNEST W. SWIDER,                                                  DAVID L. LADD,
*Attesting Officer.*                                                      *Commissioner of Patents.*